US009556567B2

(12) United States Patent
Kaylor et al.

(10) Patent No.: US 9,556,567 B2
(45) Date of Patent: *Jan. 31, 2017

(54) METHODS AND APPARATUS FOR SIDEWALK TILES

(71) Applicants: Brent M. Kaylor, Garden Grove, CA (US); Steven T. Ortiz, Garden Grove, CA (US)

(72) Inventors: Brent M. Kaylor, Garden Grove, CA (US); Steven T. Ortiz, Garden Grove, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/824,066

(22) Filed: Aug. 11, 2015

(65) Prior Publication Data
US 2016/0040366 A1      Feb. 11, 2016

Related U.S. Application Data

(63) Continuation of application No. 14/445,602, filed on Jul. 29, 2014, now Pat. No. 9,103,075, which is a
(Continued)

(51) Int. Cl.
| | |
|---|---|
| *E01C 9/00* | (2006.01) |
| *E01C 5/08* | (2006.01) |
| *E01C 9/08* | (2006.01) |
| *E01C 5/00* | (2006.01) |
| *E01C 11/16* | (2006.01) |

(Continued)

(52) U.S. Cl.
CPC .............. *E01C 9/002* (2013.01); *E01C 5/003* (2013.01); *E01C 5/006* (2013.01); *E01C 5/08* (2013.01); *E01C 5/22* (2013.01); *E01C 9/00* (2013.01); *E01C 9/086* (2013.01); *E01C 11/02* (2013.01); *E01C 11/16* (2013.01); *E01C 11/18* (2013.01); *E01C 15/00* (2013.01)

(58) Field of Classification Search
CPC .............. E01C 5/08; E01C 5/006; E01C 5/00; E01C 9/086; E01C 9/00; E01C 15/00; E01C 11/16; E01C 9/002; E01C 5/003; E01C 5/22; E01C 11/18; E01C 11/02
See application file for complete search history.

(56) References Cited

U.S. PATENT DOCUMENTS 1,673,630 A * 6/1928 Madge ...................... E01O 5/18
404/32
2,299,318 A * 10/1942 Forsberg ................ E01C 9/001
249/9
(Continued)

*Primary Examiner* — Abigail A Risic
(74) *Attorney, Agent, or Firm* — Alford Law Group, Inc.; Vy H. Vu

(57) ABSTRACT

A system and method for forming concrete tiles for use in concrete walkways and concrete patios and courtyards. The system includes a unitary frame with two or more slanted sidewalls with a plurality of pickup points placed within an interior opening of the unitary frame. Concrete poured into the interior opening of the frame forms a beveled or slanted concrete sidewalk tile. The pickup points are buried in the beveled concrete sidewalk tiles. When an opening in the pickup points is uncovered, a means to pick and place the beveled concrete sidewalk tiles is provided. Slanted or beveled sidewalls prevent binding to or interference with adjacent slanted or beveled sidewalk tiles to facilitate lifting.

12 Claims, 17 Drawing Sheets

Related U.S. Application Data continuation of application No. 11/956,636, filed on Dec. 14, 2007, now abandoned.

(60) Provisional application No. 60/984,720, filed on Nov. 1, 2007.

(51) Int. Cl.
*E01C 5/22* (2006.01)
*E01C 11/02* (2006.01)
*E01C 11/18* (2006.01)
*E01C 15/00* (2006.01)

(56) References Cited

U.S. PATENT DOCUMENTS

| | | | | |
|---|---|---|---|---|
| 2,902,745 | A * | 9/1959 | De Brigard | E04G 11/46 249/176 |
| 3,596,971 | A * | 8/1971 | Courtois | B28B 23/005 294/89 |
| 4,529,162 | A * | 7/1985 | Tsuzuki | B28B 7/02 249/158 |
| 5,242,249 | A * | 9/1993 | Grayson | E04B 1/4121 405/284 |
| 6,658,810 | B2 * | 12/2003 | DeLoach, Sr. | B28B 23/024 249/18 |
| 8,496,396 | B1 * | 7/2013 | Allen | E01O 5/08 404/36 |
| 2002/0172554 | A1 * | 11/2002 | Danahy | E01C 11/005 404/75 |
| 2006/0034652 | A1 * | 2/2006 | Sanders | E01O 5/08 404/17 |
| 2014/0053475 | A1 * | 2/2014 | Siqueiros | E01C 23/10 52/125.1 |

* cited by examiner (Background)

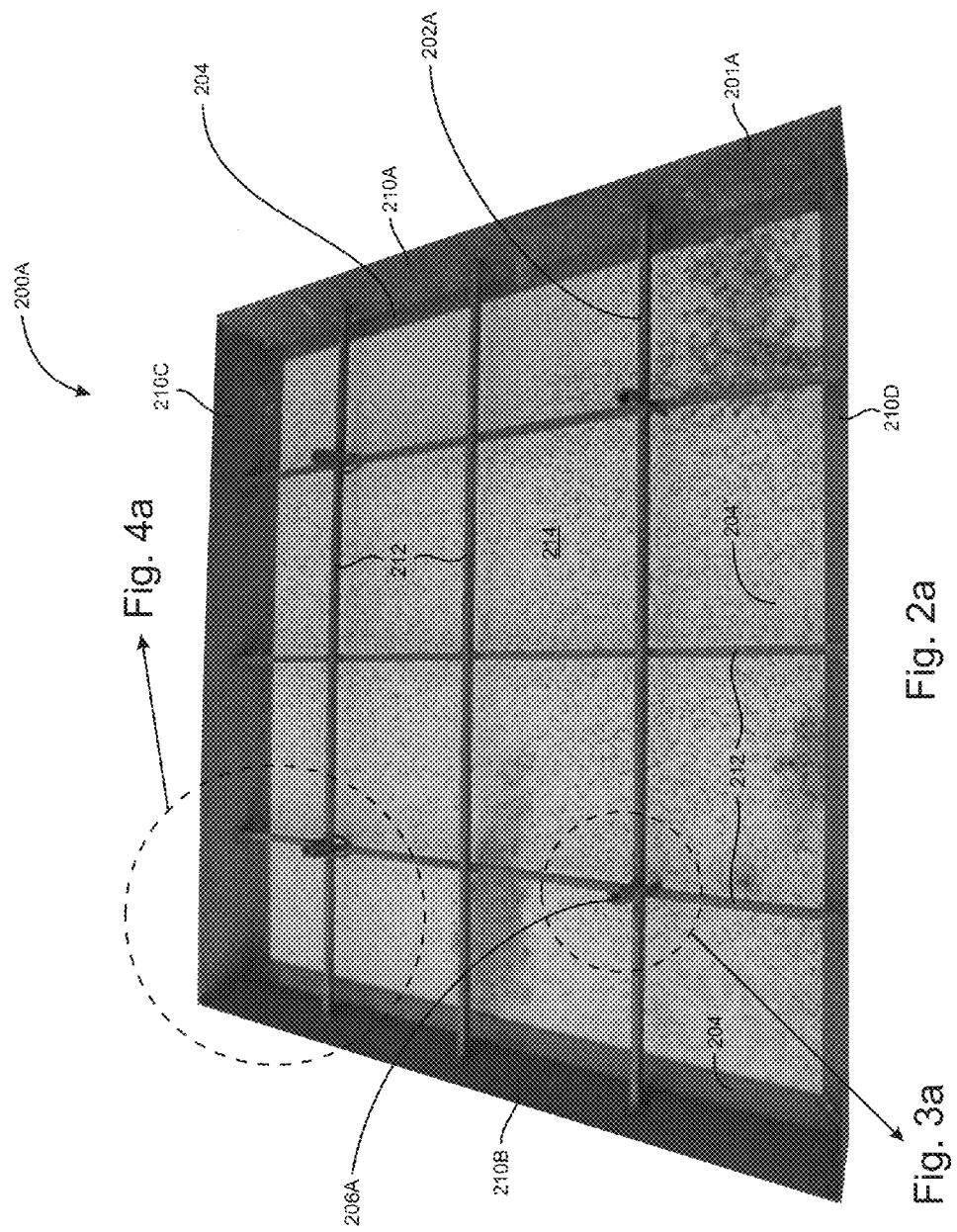

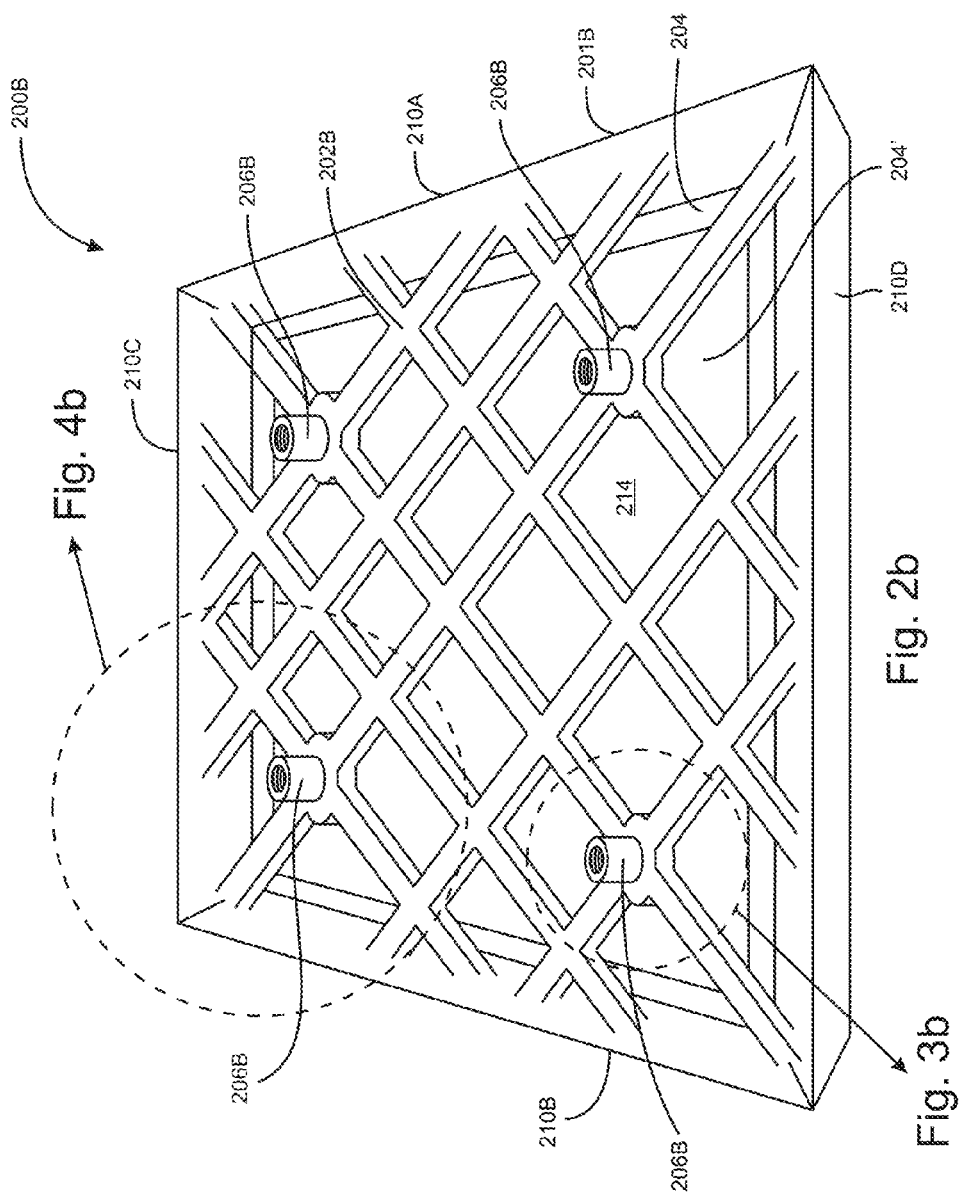

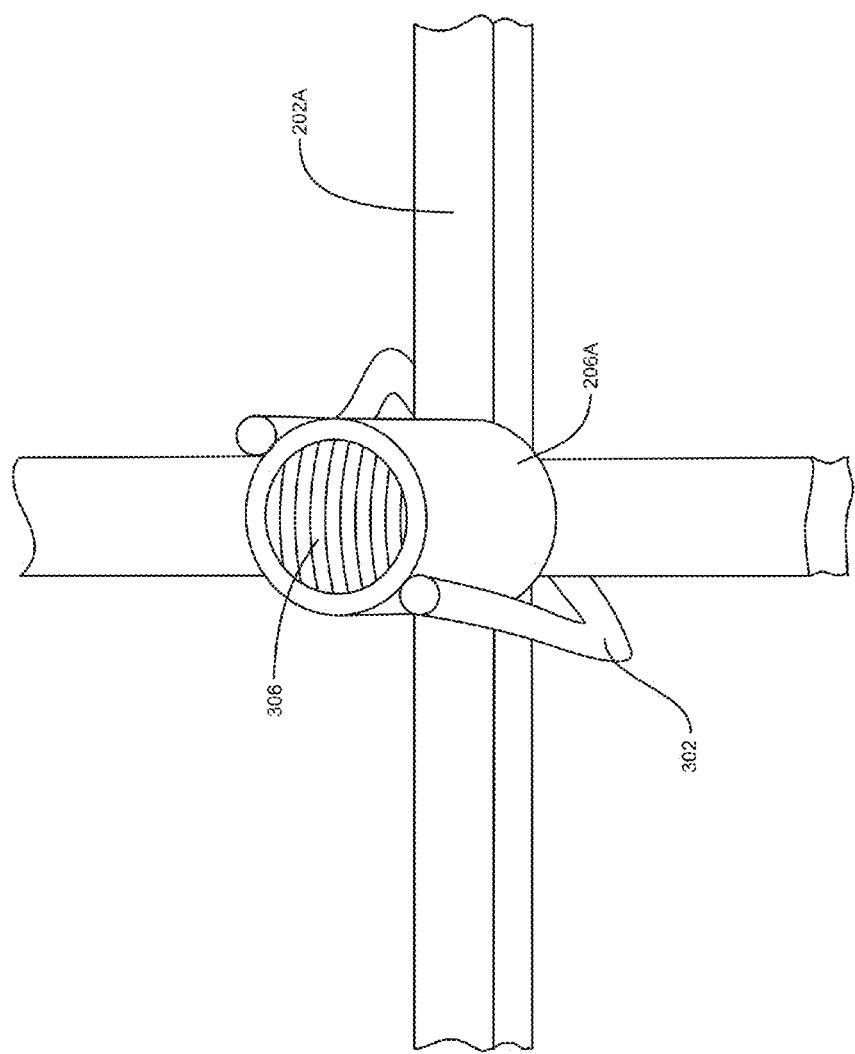

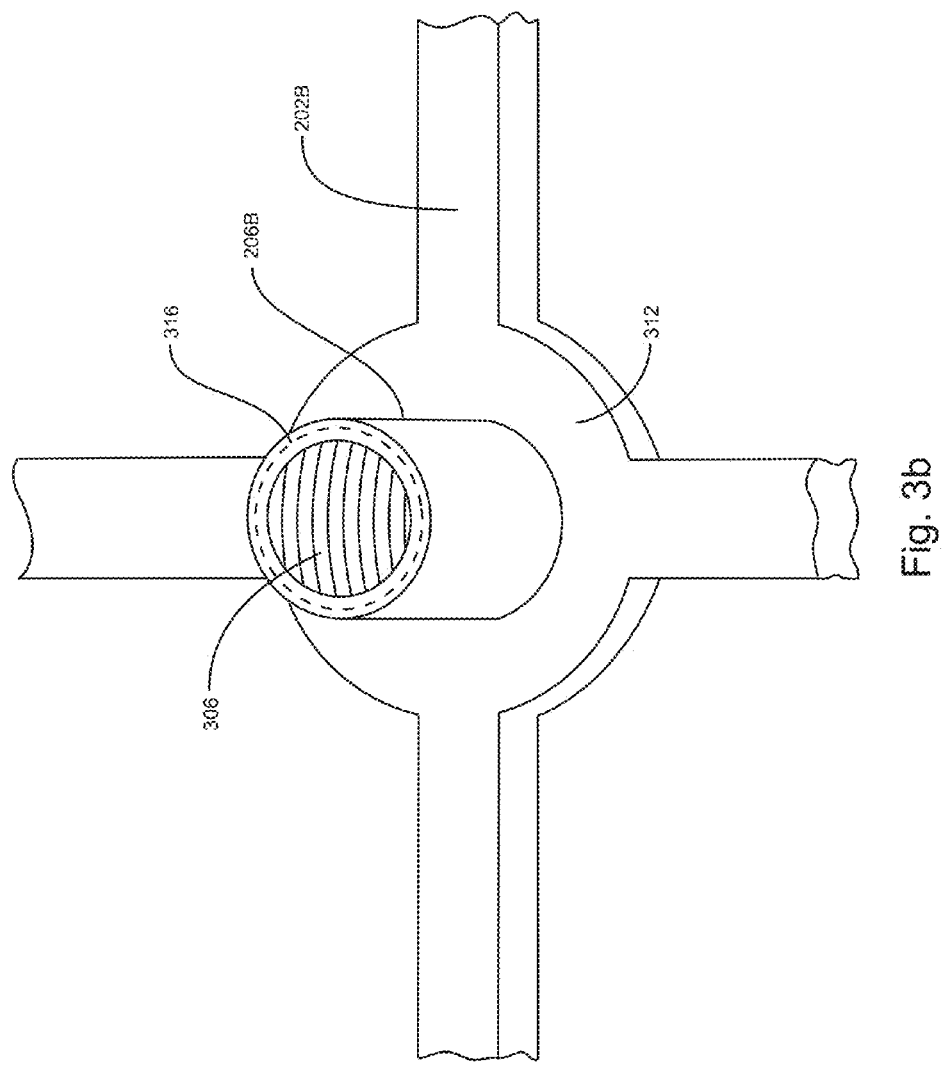

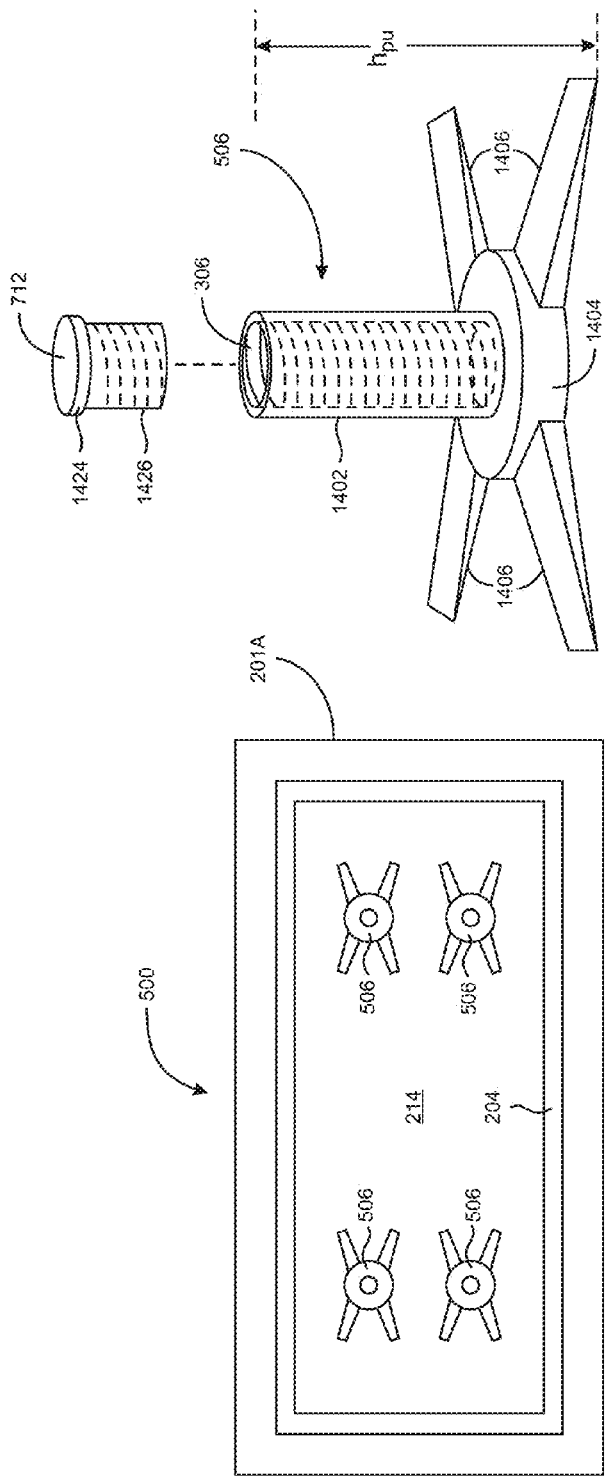
Fig. 5a
Fig. 14
Fig. 5b
Fig. 5c

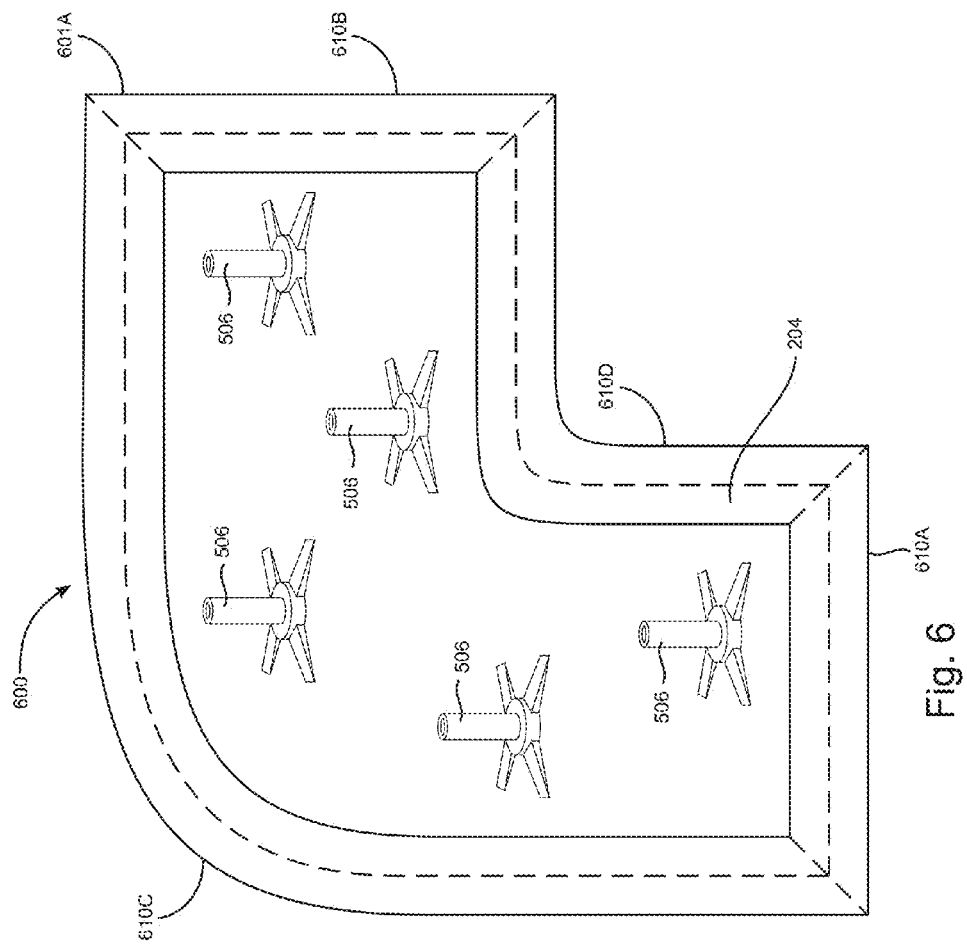

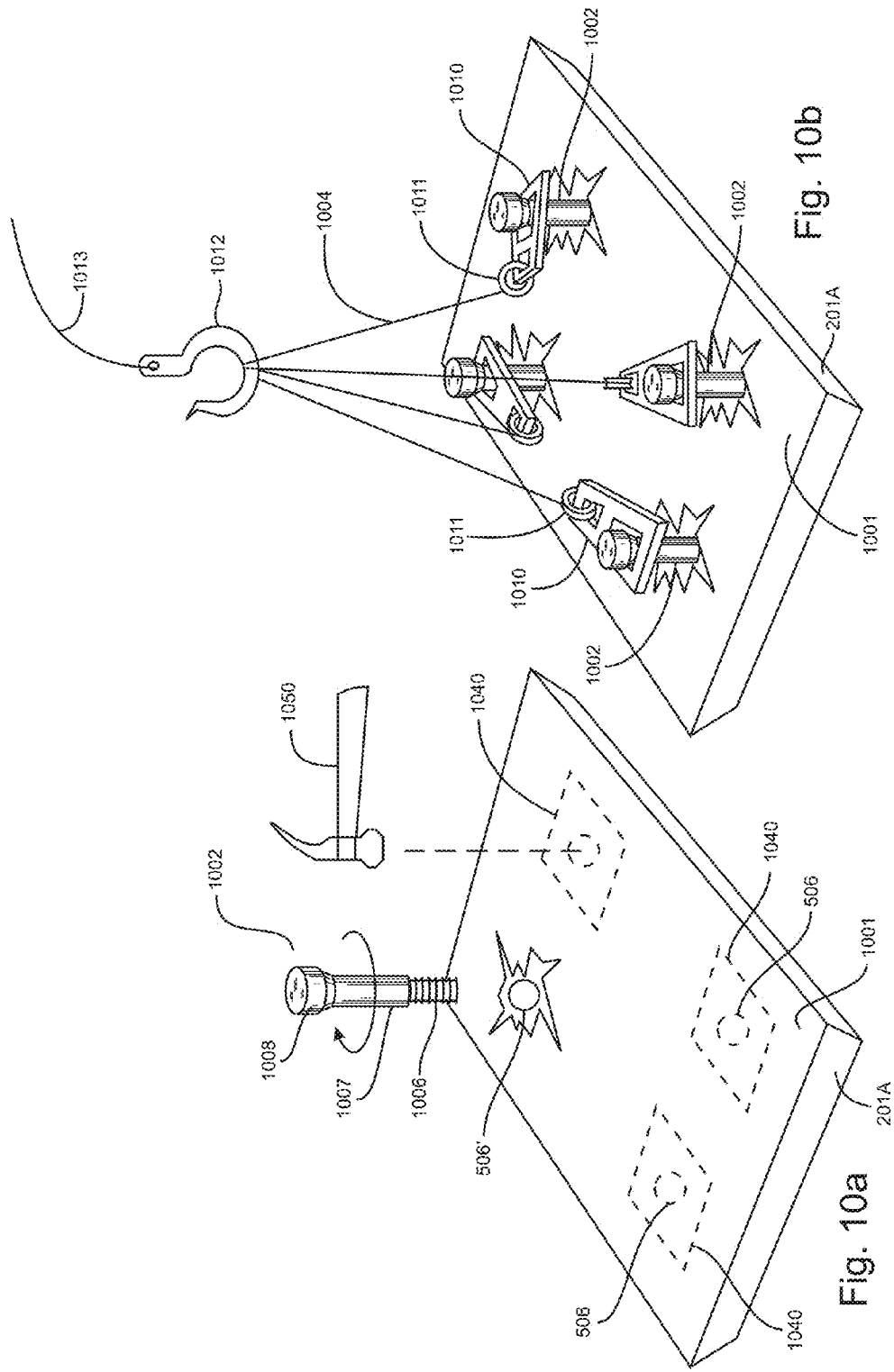

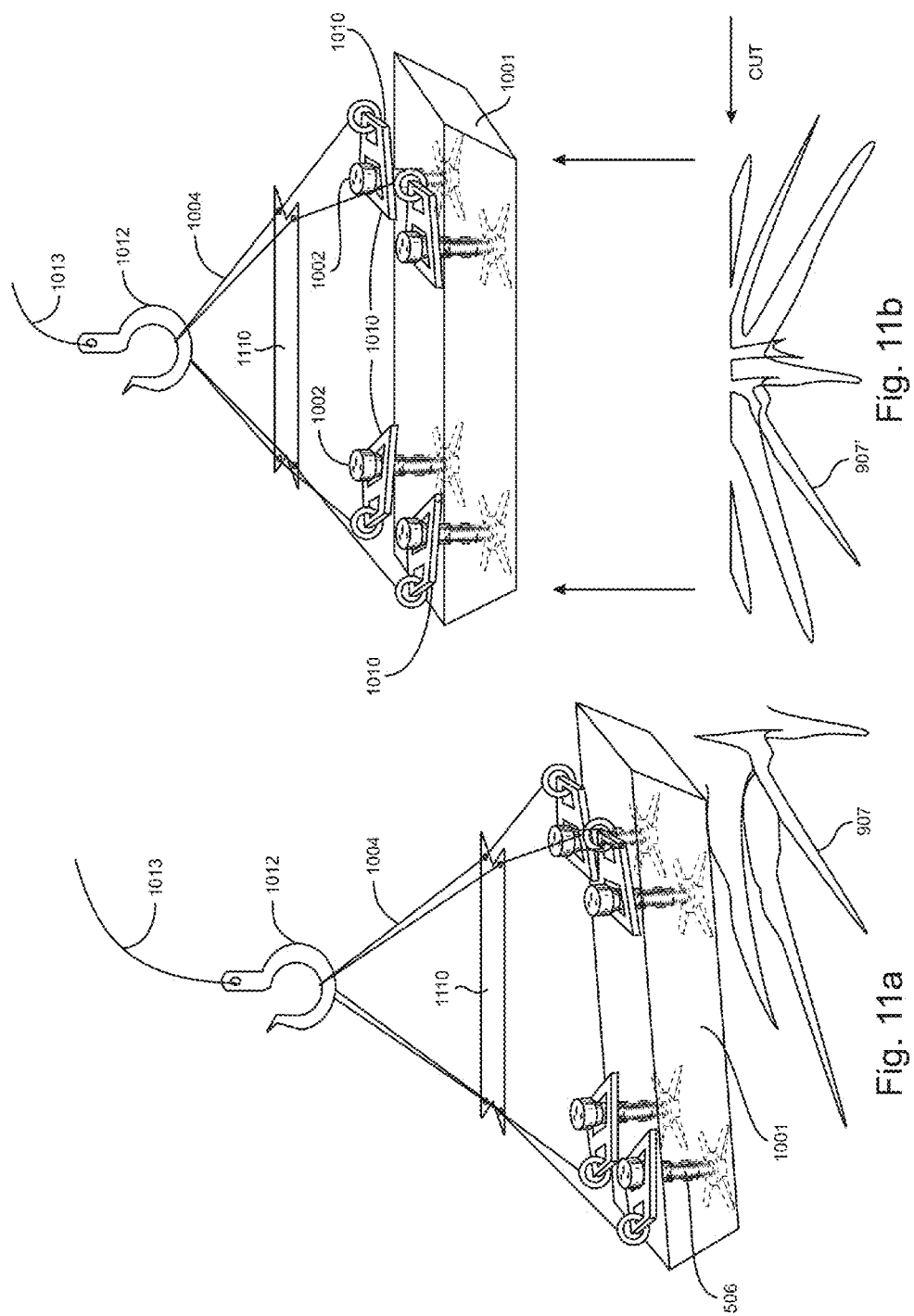

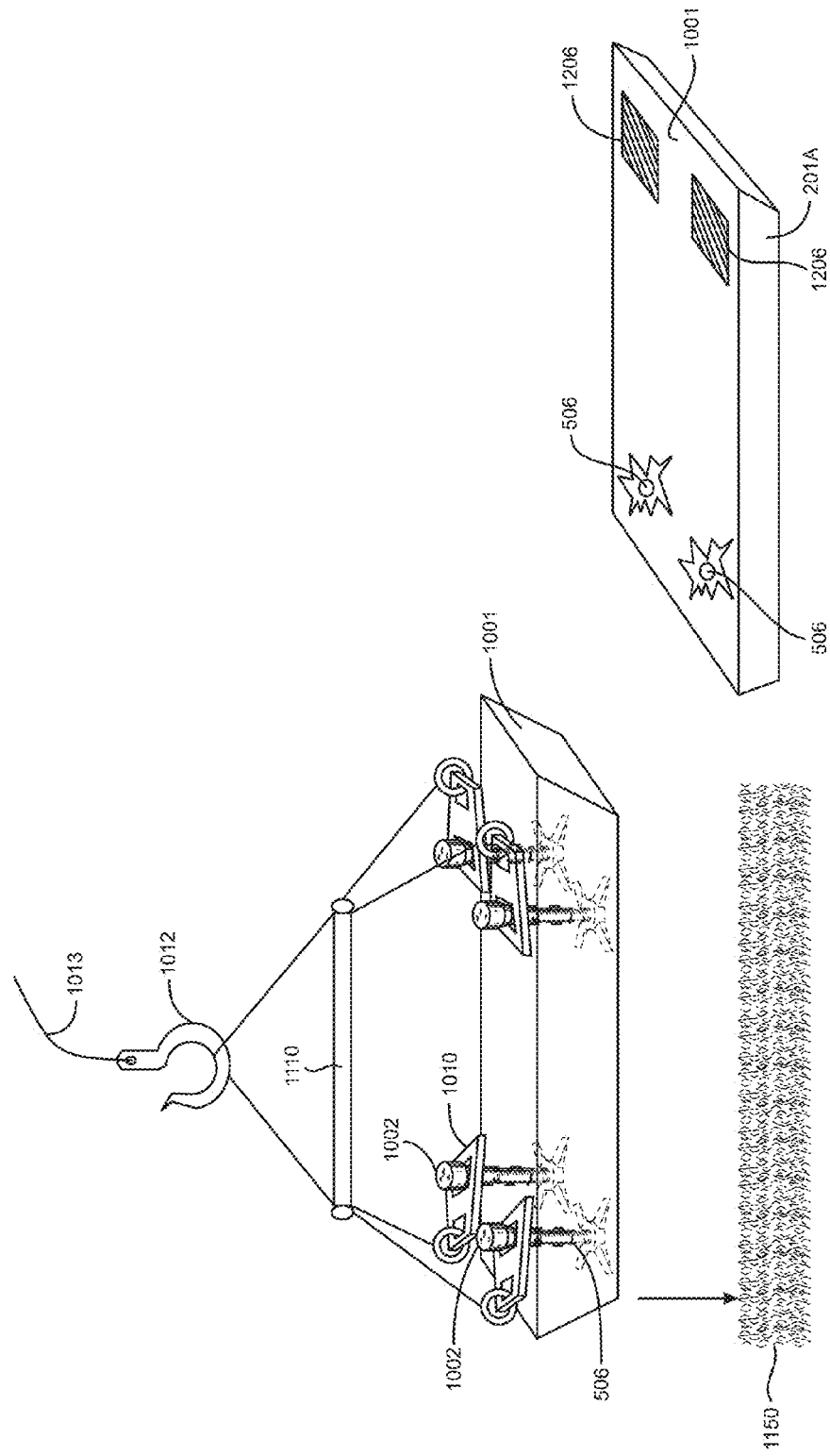

US 9,556,567 B2

METHODS AND APPARATUS FOR SIDEWALK TILES

CROSS REFERENCE TO RELATED APPLICATION

This United States (U.S.) patent application is a continuation application that claims the benefit of U.S. patent application Ser. No. 14/445,602 entitled METHODS AND APPARATUS FOR SIDEWALK TILES, filed Jul. 29, 2014, now issued. U.S. patent application Ser. No. 14/445,602 is a continuation application that claims the benefit of U.S. patent application Ser. No. 11/956,636 entitled METHODS AND APPARATUS OF SIDEWALK TILES, filed Dec. 14, 2007, which in turn claims the benefit of U.S. provisional patent application No. 60/984,720 entitled UNITARY FRAME FOR REMOVEALBE SIDEWALK TILES, filed Nov. 1, 2007 by Brent M. Kaylor et al.

FIELD

The embodiments of the invention generally relate to concrete walkways.

BACKGROUND

Referring now to background FIG. 1, trees 101A-101B are often planted near sidewalk 100 to provide aesthetics and shade from sunlight. Large trees, especially evergreens and shade trees, such as ficus, are popular with city planners because of their hardiness and year round appeal. Unfortunately trees may have extensive roots systems that over time may displace or even crack sidewalk tiles.

Each tree 101A-101B may have one or more roots 102A-102B that may spread out from the original position where the trees were planted. Sometimes these roots go under sidewalks and force the sidewalk upward thereby cracking it so that it requires repair as illustrated by the cracks 105A-105D. The cracks may become so large over time that the broken sidewalk 100A-100D not only becomes an eyesore but a hazard to pedestrians walking over it, possibly tripping a pedestrian to fall onto the sidewalk 100.

Traditionally formed sidewalk has vertical sides. Moreover, expansion joints may be small or non-existent so they are not easily displaced or moved upward by tree root systems. As a result traditionally formed sidewalk is more likely to crack and be damaged from tree roots. The vertical sides present a relatively large surface area which closely abuts the neighboring tile leaving little or no gap between. A high friction coefficient of concrete resists abutting sides of sidewalk from sliding against each other. As pressure from the roots increases, traditionally formed tiles of sidewalk may crack before they are displaced as illustrated by the cracks 105A-105D in sidewalk tiles 100A-100D. Even if they don't crack, displaced tiles still present a hazard to a pedestrian. Lifted edges of a sidewalk tile may trip up a pedestrian leading to an annoying if not painful tumble.

Each city may be in charge of repairing a broken sidewalk. Once cracks form or the tiles are displaced, city contractors may grind uplifted cracks or patch the cracks with asphalt. However if the cracks are unrepairable, city contractors may generally demolish the offending sidewalk tile. The broken sidewalk is cut away and demolished into rubble so that it can be hauled away.

With the sidewalk removed, the exposed tree roots that cause the damage can be cut away from the tree from the surface below the sidewalk. The soil underneath the sidewalk can be re-graded. A frame of lumber (often two-by fours cut and hammered together with nails) is built around the exposed soil where new sidewalk tile is to be formed. New concrete is poured into the wooden frame to form a new slab of concrete to replace the broken portion of the sidewalk. Depending on the weather concrete may take 3-7 days to cure properly, during which time the sidewalk may be roped off to avoid use.

After sufficient curing time to form concrete sidewalk, the city contractors return to the site and remove the wooden frame and barricades. Landscaping may also be performed to restore the area into having a more esthetic look.

Cities may have hundreds of miles of sidewalks with trees periodically planted next to it. Traditional repair of sidewalks may be costly for a city and its tax paying citizens if there are numerous miles of tree-line sidewalks. Reduction in material and labor time costs to repair sidewalks may save considerable sums of money for a city with numerous miles of tree-lined sidewalks.

BRIEF SUMMARY

The embodiments of the invention are summarized by the claims that follow below.

BRIEF DESCRIPTIONS OF THE DRAWINGS

FIG. 2A is a top perspective view of an exemplary embodiment of an assembled sidewalk construction kit.

FIG. 2B is a top perspective view of another exemplary embodiment of a sidewalk construction kit including reinforcement and pickup points assembled together.

FIG. 3A is a magnified view of FIG. 2A illustrating an exemplary pickup point assembled to the reinforcement latticework.

FIG. 3B is a magnified view of FIG. 2B illustrating an exemplary pickup point molded together to the reinforcement latticework.

FIGS. 5A-5C are different views of another exemplary embodiment of a sidewalk construction kit for rectangular sidewalk tiles.

FIG. 6 is a top view of another exemplary embodiment of a sidewalk construction kit for curved sidewalk tiles.

FIGS. 10A-10C are top perspective views illustrating assembly of anchor inserts and cables to pickup points in a beveled removable concrete tile.

FIGS. 11A-11C are views illustrating pickup and placement of a beveled removable concrete tile after grading repair.

FIG. 12 is a top perspective view of concrete patching over pickup points after cables and anchor inserts are removed.

FIG. 14 is a perspective view of an exemplary independent pickup point.

DETAILED DESCRIPTION

Figure 1:
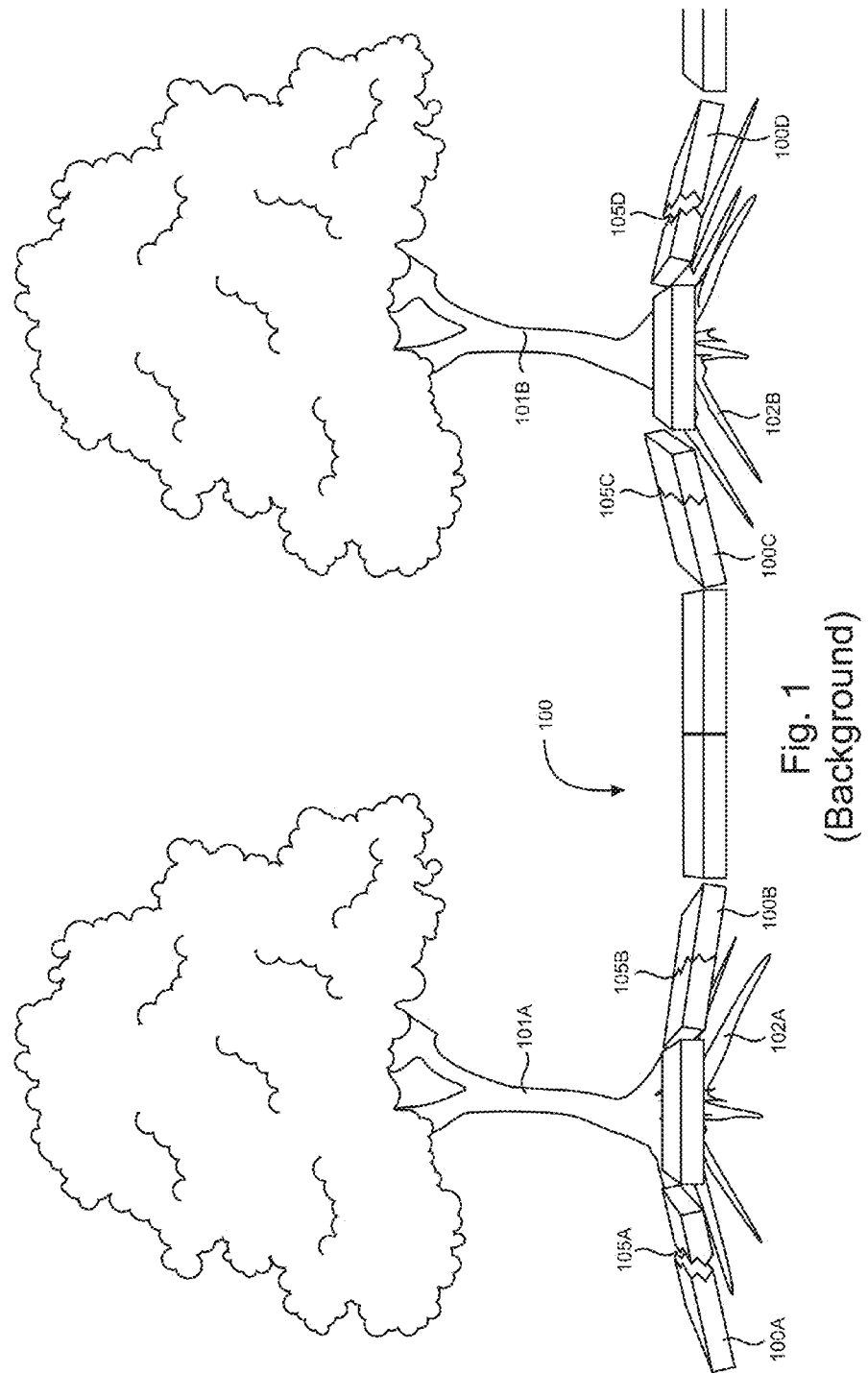
FIG. 1 is background figure illustrating the problem of having tree-lined sidewalk.

In the following detailed description of the embodiments of the invention, numerous specific details are set forth in order to provide a thorough understanding. However, the embodiments of the invention may be practiced without these specific details. In other instances well known methods, procedures, materials, and elements have not been described in detail so as not to unnecessarily obscure aspects of the embodiments of the invention.

Generally, the embodiments of the invention include a beveled sidewalk tile construction kit to receive concrete to form a beveled sidewalk tile. The beveled sidewalk tile construction kit includes a unitary frame and a plurality of reinforced pickup points to be positioned within the frame. The unitary frame may act as a mold when concrete is poured into the frame. After the concrete cures to the frame, the frame provides additional support as a part of the beveled sidewalk tile. The beveled sidewalk tile is removable and replaceable so that repairs may be made to the grading or surface upon which the sidewalk tile was resting. After repairing the grading or surface, the beveled sidewalk tile can then be replaced on the surface and cosmetically patched.

Referring now to FIGS. 2A-4A, a beveled sidewalk construction kit 200A is illustrated. The construction kit 200A includes a beveled unitary frame 201A and a reinforcement structure 202 such as a plurality of reinforcement bars (rebar). The construction kit 200A may further include one or more pickup points 206A coupled to the reinforcement structure 202 to allow a slanted or beveled sidewalk tile to be removable. Without the one or more pickup points 206A, the height of the sidewalls of the unitary frame may be shorter to conserve concrete and form a more light-weight beveled sidewalk tile that is more suited to a do it yourself sidewalk construction kit for use around a home.

The unitary frame 201A may be rectangular like a window frame and include four sides or sidewalls 210A-210D, a base lip 204, and an interior opening 214. One or more of the sides or sidewalls 210A-201AD of the frame 201A are beveled or slanted outward from the base lip 204 to form beveled or slanted sides or sidewalls. Instead of being perpendicular and forming an angle of ninety degrees with the respect to the base lip 204, the beveled or slanted sidewalls form an angle greater than ninety degrees with the base lip. Beveled or slanted sidewalls allow the sidewalk tile to be lifted up and away from any neighboring sidewalk or sidewalk tile without binding against. In FIG. 2A, all four sides or sidewalls 210A-210D are shown as being slanted or beveled. However it should be appreciated that only one side or sidewall of the frame 201A may be slanted to lower the surface area between two adjacent sidewalk tiles.

The base lip 204 of the frame may provide a foundation for the frame when the frame is placed into soft soil or loose sand. The added surface area of the base lip 204 may prevent the frame from sinking into the loose soil and creating an uneven sidewalk tile. The base lip 204 provides support along the edges of the concrete formed in the interior opening 214. The base lip 204 further prevents the sides or sidewalls 210A-210D of the frame from digging into a surface to ease the pickup of a sidewalk tile. The interior opening 214 allows water to drain when concrete is setting within the interior opening. However in another implementation, the base lip 204 may instead be extended out from each side 201A-201D and merged together to completely form a bottom side 204' of the frame 201A. Holes may be added to the bottom side 204' to provide a perforation to allow water to escape when concrete is setting. With a closed bottom side 204', a light-weight concrete (e.g., cement with a light weight aggregate, such as volcanic rock or pumice stone) or asphalt may be poured or placed into the interior opening 214 to provide a temporary sidewalk tile.

The unitary frame 201A may be formed of various materials such as metal, plastic, reinforced plastic, fiberglass, reinforced fiberglass, acrylic, polymer, thermoplastic polymer (e.g., polyvinyl chloride), or poly-resin. In one embodiment of the invention, the unitary frame is formed of sixteen gauge steel.

The unitary frame 201A may include a reinforcement structure 202A formed within the interior opening 214 of the frame 201A. A reinforcing mesh, grid or latticework 202A may be formed in the interior opening 214 up to the sides or sidewalls 210A-210D of the frame 201A. In some implementations, the latticework 202A may be formed by assembling a grid of reinforcement bars 212 together. The sides or sidewalls 210A-210D may have U-like shaped pockets 402 (see FIG. 4A) to receive the reinforcement bars and hold them in place supported above the base lip 204 within the interior opening 214. The latticework 202A may be formed of various materials such as metal, plastic, reinforced plastic, fiberglass, reinforced fiberglass, acrylic, polymer, thermoplastic polymer (e.g., polyvinyl chloride), or poly-resin. In one implementation, the reinforcement bars 212 are steel rebar attached to the frame in a grid-like pattern and periodically tied together at cross points. The reinforcement bars 212 are attached to the frame so that they supported above the base lip 204. If the pockets 402 are unavailable to support the reinforcement bars 212 above the base lip 204, the ends of steel rebar may be welded to the sides or sidewalls of a metal frame approximately half-way between the base lip 204 and a top edge of the frame.

The latticework 202A may provide a structure upon which pickup points 206A may be attached. Pickup points are devices to allow a beveled or slanted sidewalk tile to be replaceably removed during root removal and grading.

Figure 4A:
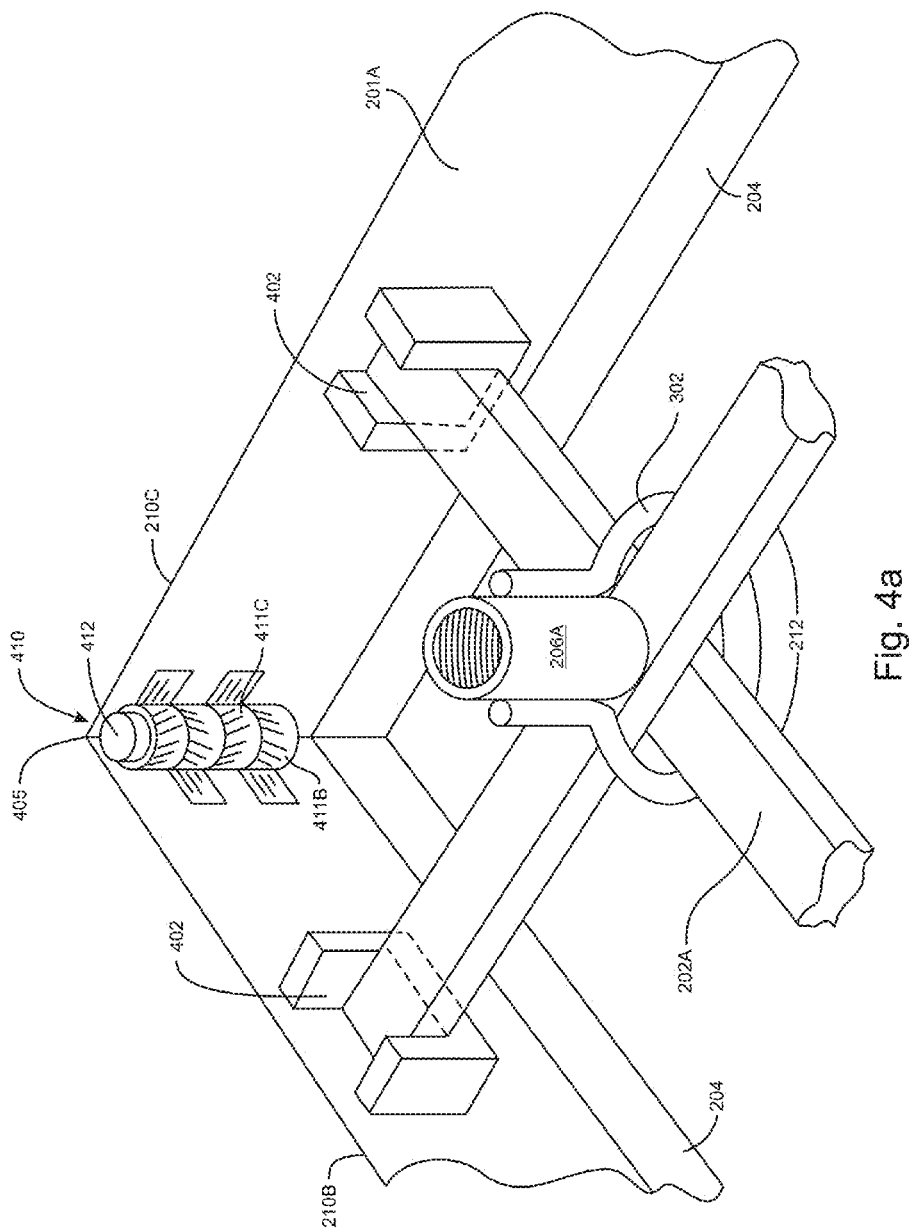
FIG. 4A is a magnified perspective view of a corner of the assembled sidewalk construction kit of FIG. 2A illustrating the reinforcing structure assembled to sides or sidewalls of the unitary frame.

In FIGS. 3A and 4A, perspective views of the pickup point 206A are shown. The pickup point 206A shown is a threaded cylindrical tube with an opening at the top. The interior of the tube is threaded to receive and securely hold a corresponding threaded eye-bolt or anchor insert. Metal loop 302 is welded to the side of the cylindrical tube and extends below the cylindrical tube. In this embodiment the metal loop is one continuous piece and the rebar 212 may be slid into place prior to being welded to the frame. Other methods of securely attaching the pickup points 206A to rebar 222 may be used, such as by wire tie wrap.

In some embodiments of the invention, the pickup points 206A are coupled to the latticework 202A if available. In other embodiments of the invention without a latticework 202, the pickup points 506 (see FIGS. 5A-5C) themselves may include a reinforcement structure. The pickup points 206A are coupled to the reinforcing grid or latticework 202A so that they won't be displaced when concrete is poured into the opening 214 of the frame 201A.

In the embodiment illustrated in FIG. 2A, four pickup points 206A are attached to the intersection of the rebar. As shown in FIG. 3A, a metal loop 302 from the pickup point 206A may wrapped around the intersection of the reinforcement bars. The loop extends below the pickup point and forms a circular opening sufficiently large to receive the reinforcing structure. Steel rebar may be received by the loop 302. The base of the pickup point 206A may welded onto steel rebar. For extra strength, the loop may be welded onto steel rebar as well.

As best shown in FIG. 3A, the pickup points 206A include a threaded opening 306 into which a threaded bolt may be screwed. A plug or caps 712 (see FIG. 7) may be inserted into the threaded opening 306 so that when concrete is poured, the threaded opening is not filled with concrete. To avoid corrosion, the base of the pickup point 206A is preferably positioned above the plane of the base lip 204 so that concrete forms underneath and rests on any soil or grading over which a beveled or slanted sidewalk tile is placed.

FIG. 4A illustrates the placement of the rebar in interior opening of the frame with ends coupling to the sides or sidewalls of the frame with respect to the base lip 204. The rebar 212 are attached to the sides or sidewalls of the unitary frame in such a way that the pickup points do not touch the soil. Generally sidewalks are laid on loose dirt or sand which may become wet from subsurface water sources or runoff from lawns onto the sidewalk. It is undesirable for pickup points 206A to be weakened by corrosion. Therefore the pickup point 206A may benefit from being substantially surrounded by concrete so as to not touch any moist soil underneath a sidewalk.

The unitary frame may be formed by bonding individual side pieces 210A-210D together. If the side pieces 210A-210D are steel, the side pieces may be welded together at the mitered corners 405. Alternatively, the side pieces 210A-210D may be assembled together at the corners using a tongue and groove system (not shown) or a hinge-like corner joining mechanism (hinge joint) 410 as illustrated in FIG. 4A. Cylinders of a first portion 411B of the hinge joint are coupled to the side 210B. Cylinders of a second portion 411C of the hinge joint are coupled to the side 210C. The cylinders of the first portion and the cylinders of the second portion of the hinge joint 410 are offset from each other so they can interlaced together at the corner 405. When properly interlaced, openings in the cylinders of the first portion and the second portion align together similar to a door hinge so that a pin 412 may be inserted and hold the sides or sidewalls 210B and 210 coupled together at the mitered corner 405.

To further simplify construction of a beveled or slanted sidewalk tile, the construction kit may include a unitary frame that is molded or stamped as one piece so as to avoid much assembly of the unitary frame.

Referring now to FIGS. 2B-4B, a beveled or slanted sidewalk construction kit 200B is illustrated with a unitary frame 201B. The unitary frame 201B is molded or stamped as one piece including the reinforcing lattice structure or latticework 202B. That is, the reinforcement structure 202B may be a grid or latticework composed of bars or laths that are molded/stamped with the frame 201B as one. Similarly, a plurality of pickup points 206B may be further molded/stamped together with the unitary frame 201B and the reinforcement structure as one piece.

The molded/stamped frame and reinforcement structure 202B substantially simplifies assembly of the beveled or slanted sidewalk construction kit 200B. The plurality of pickup points 206B allow a slanted or beveled sidewalk tile to be removable. However, without the one or more pickup points 206B, the height of the sidewalls of the unitary frame may be shorter to conserve concrete and form a more light-weight beveled sidewalk tile that is more suited to a do it yourself sidewalk construction kit for use around a home.

After the construction kit 200A is assembled, the like numbered elements of the sidewalk construction kit 200B have substantially similar functionality which is incorporated here by reference for reasons of brevity. For example, the unitary frame 201B, similar to the unitary frame 201A, has one or more beveled or slanted sides or sidewalls 210A-210D and a base lip 204 to provide the same or similar functionality of like numbered elements. The latticework 202B reinforces the strength of the concrete as does the latticework 202A. In another implementation, the base lip 204 may instead be extended out from each side 201A-201D and merged together to completely form a bottom side 204' of the frame 201B.

Figure 4B:
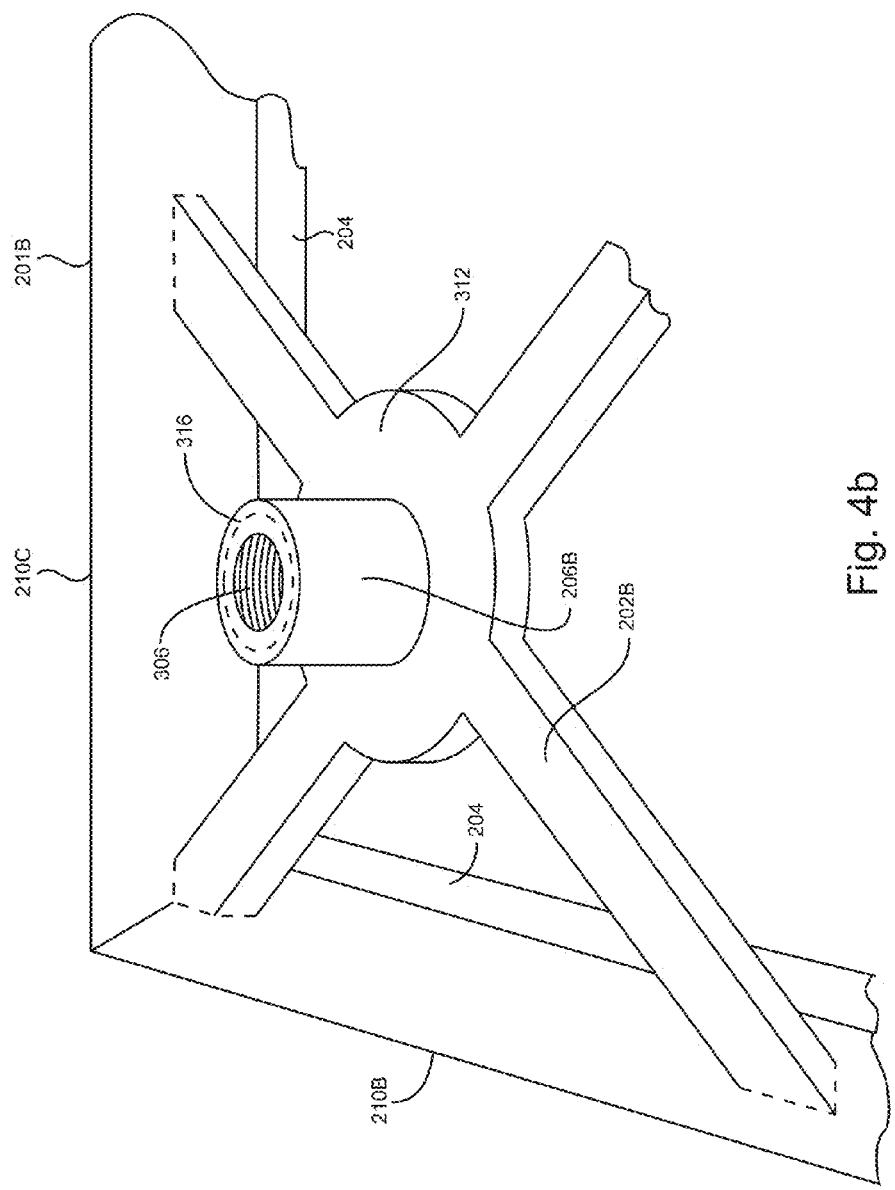
FIG. 4B is a magnified perspective view of a corner of the sidewalk construction kit of FIG. 2B illustrating the reinforcing structure molded into sides or sidewalls of the unitary frame.

Instead of having to manually assemble the pickup points 206A to the latticework 202A, the pickup points 206B are molded or stamped together with the latticework 202B and the frame 201B during manufacturing of the construction kit 200B. Moreover, the latticework 202B properly positions the pickup points 206B at an appropriate height so they are buried by concrete when it is level with the top edge of the sides or sidewalls 210A-210D of the frame 201B. As can be seen in FIG. 4B, the latticework 202B merges into the sides or sidewalls 210B and 210C at an appropriate height to keep the pickup point properly positioned within the concrete when it is poured.

As illustrated in FIGS. 2B-4B, the pickup points 206B are preferably formed at cross points of the latticework 202B with a larger reinforcement base portion 312. If formed of a reinforced plastic or reinforced fiberglass, the pickup points 206B may include a metal threaded sleeve 316 with the threaded opening 306 to better support the load of the sidewalk tile when it is lifted.

Instead of a latticework or reinforcement structure, reinforced pickup points may be used in the interior opening 214 of a unitary frame 201A in accordance with another embodiment of the invention.

Referring now to FIGS. 5A-5C, another configuration of a beveled or slanted sidewalk construction kit 500 is illustrated. The beveled or slanted sidewalk construction kit 500 includes a beveled or slanted unitary frame 201A, and a plurality of independent reinforced pickup points 506. The reinforced pickup points 506 are independently positioned within the interior opening 214 of the unitary frame 201A. The beveled or slanted sidewalk frame 201A includes one or more beveled or slanted sidewalls and the base lip 204. As the pickup points are not attached to the unitary frame, the pickup points may be placed in any position within the interior of the unitary frame as desired.

Instead of including a reinforcing structure coupled to the frame 201A, the pickup points 506 include their own reinforcement structure. For example, rods may be attached to the base of the pickup points as their reinforcement structure. The reinforcement structure is to strengthen the attachment of embedded pickup points to the concrete of a beveled or slanted sidewalk tile. Other reinforcement devices or structures may be coupled to the pickup points to provide reinforced pickup points to prevent dislodging of the pickup points during load bearing.

Referring now to FIG. 14, a perspective view of an independent reinforced pickup point 506 is illustrated. The pickup point 506 may include a cylindrical tube 1402, a base 1404 coupled to the tube 1402 and a plurality of legs 1406 coupled to the base 1402.

The cylindrical tube 1402 includes the threaded opening 306 in its interior to receive a threaded anchor insert or a threaded eye bolt. Additionally, a plug or cap 712 may couple into the threaded opening 306 as a part of the construction kit.

The base 1404 and legs 1406 of the pickup point 506 may rest upon the grading surface. The base 1404 and legs 1406 of the pickup point 506 may be formed of a non-ferrous material so as to avoid rust and corrosion from moisture in the grading surface. The base and legs 1406 lifts the cylindrical tube off of the soil surface and may prevent corrosion of the tube, if metal, or a metal insert.

The cylindrical tube 1402 is rigidly coupled to the base 1404 so that the tube avoids being pulled out of the concrete when a beveled or slanted sidewalk tile is lifted. The base 1404 and legs 1406 provide a larger surface area than that of the tube. Once concrete is poured into the unitary frame and allowed to cure, the base 1404 and legs 1406 may prevent the cylindrical tube 1402 of the pickup point 506 from being pulled out of the concrete during load.

FIG. 14 also illustrates a perspective view of the cap or plug 712. The cap or plug 712 includes a thin head 1424 and a shank or shaft 1426. The shank or shaft 1426 may be hollow to allow the cap or plug 712 to be readily pried up and out from the opening 306 in the pickup point 506. Alternatively, the shank or shaft 1426 may be threaded to threadingly couple to the threads of the opening 306. In which case, the head 1424 may include a hex head or a screw driver chisel opening to allow a wrench or screwdriver to readily allow the cap or plug 712 to be readily screwed into and out of the pickup points. Note that the cap or plug 712 may also be used with other embodiments of the pickup point including pickup points 206A-206B illustrated in FIGS. 2A-4A and 2B-4B, respectively.

In FIG. 14, the independent pickup point 506 has a height $h_{PU}$ at its top surface that is just below the top surface of the concrete once the unitary frame is filled with concrete level with the top edge of each side. As illustrated in FIG. 5B, the height $h_{PU}$ allows for a concrete thickness $TH_c$ between the top of the pickup point 506 with out the cap 712. The head 1424 of the cap 712 may slightly reduce the concrete thickness $TH_c$ by its own thickness. Thus not only is the top surface of the pickup point 506 but the top surface of the cap 712 plugged into the pickup point is buried just under the top surface of the concrete.

Frames 201A-201B have been previously illustrated as being square or rectangular. However, not all sidewalks are rectangular in shape. Sidewalks may be curved to accommodate gradually turning corners.

Referring now to FIG. 6, a beveled or slanted sidewalk construction kit 600 is illustrated with a curved unitary frame 601A. The curved unitary frame 601A includes beveled or slanted sides or sidewalls 610A-610B to interface to other beveled or slanted tiles and curving sides or sidewalls 610C-610D to change the direction of the sidewalk tile. The curving sides or sidewalls 610C-610D may not be beveled or slanted as they may not be interfacing with any neighboring sidewalk tile that would otherwise result in interference. However, they may be beveled or slanted to ease lifting away from soil near the curving sides.

Similar to the rectangular frames 201A-201B, the curved unitary frame includes a base lip 204 running along the bottom edge of each of the sides or sidewalls 610A-610D. While the curved frame 601A is illustrated with a ninety degree curve, curves with other than ninety degrees may be formed in the curved frame 601A. Moreover, if there are differences between a right hand or left hand curve, both right handed and left handed curved frames 601A may be formed, With the curved unitary frame 601A, the construction kit 600 further includes a plurality of independent reinforced pickup points 506. The independent pickup points 506 are placed within interior opening 614 of the unitary frame 601A in sufficient numbers to bear the load of the beveled or slanted sidewalk tile should it be removed for grading repair. A reinforcement structure such as the latticework 202A-202B may be employed in the interior of the curved frame 601A to reinforce the concrete in the curved and beveled or slanted sidewalk tile. In which case, different pickup points, such as respective pickup points 206A-206B may be used with the latticework 202A-202B.

Figure 7:
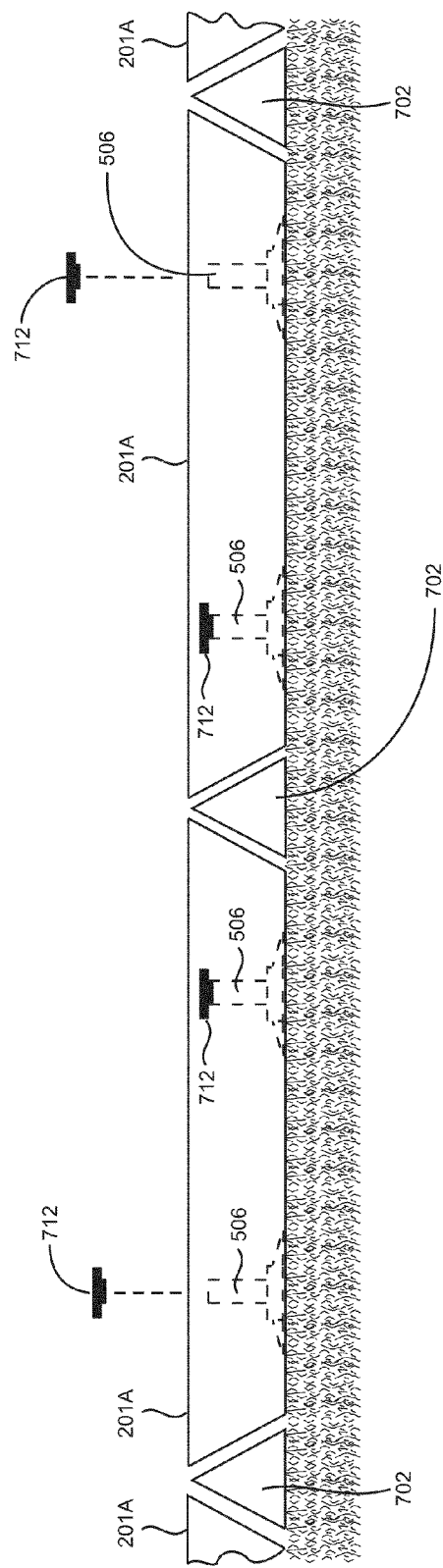
FIG. 7 is a side view of a plurality of assembled sidewalk construction kits to form concrete sidewalk tiles prior to being filled with concrete.

Referring now to FIG. 7, a plurality of beveled or slanted sidewalk construction kits along with a filler material 702 are placed adjacent each other to form a beveled or slanted tile sidewalk. The filler material 702 is placed within a triangular-liked-shaped space or gap between each unitary frame 201A. Felt or hardened foam may be used as the filler material 702 to allow expansion and contraction of the sidewalk tiles and deter water from seeping beneath the sidewalk between the tiles. Thus, the filler material 702 may also be referred to as an expansion material. The filler material 702 may further aid in preventing the sidewalk tiles from binding during removal and replacement. The filler material 702 is a strip of material running along the space at the joint between adjacent unitary frames 201A. As illustrated, the strip of filler material 702 may have the shape of a cylinder with a triangular-like-shape to fill the triangular-like-shaped gap along adjacent sidewalk tiles.

Independent pickup points 506 are placed within the unitary frame 201A. Aside from load considerations, a sufficient number of pick up points 506 should be placed within the interior opening 214 of the frame 201 to allow a sidewalk tile to be lifted without breakage and yanking out the pivot points, and to avoid undue pitch and yaw in the beveled or slanted sidewalk tile. For example, one or perhaps even two pickup points may not prevent the sidewalk tile from swaying side to side or front to back depending on their placement.

After the plurality of reinforced pickup points are placed within the frame, the interior opening 214 of the unitary frames are filled with concrete to form beveled or slanted sidewalk tile. However prior to pouring the concrete into the interior openings 214, caps 712 may be coupled into and cover the opening 306 in the pickup points 506 to prevent concrete from entering into the opening 306 of the pickup points. Plugs or caps 712 may also be coupled into and cover over the threaded openings in other types of pickup points 206A-206B. Each of the construction kits described herein may include the plugs or caps 712 for assembly together with its pickup points.

Figure 8:
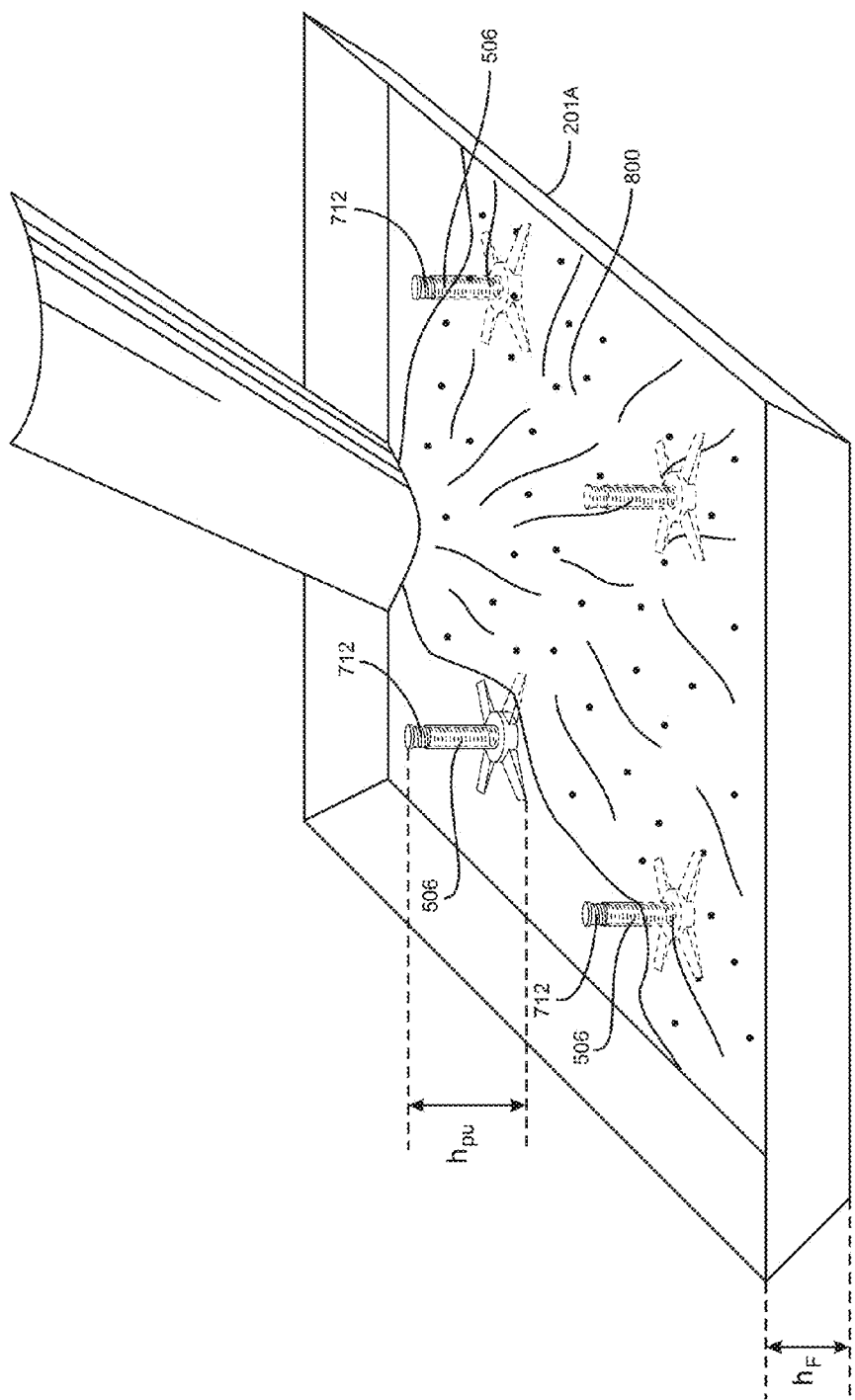
FIG. 8 is a top perspective view of a sidewalk construction kit being filled with concrete to form a beveled removable concrete sidewalk tile.

Referring now to FIG. 8, opening 214 in the frame of the sidewalk construction kit is filled with concrete 800 to form a beveled or slanted concrete sidewalk tile. The height $h_{PU}$ of the pickup points 206, 216, 506 and caps 712 with respect to the height $h_F$ of the sides or sidewalls 210A-210D of the frame is such that the plurality of pickup points and their caps 712 are buried just below the concrete surface so they are hidden from view.

The concrete 800 preferably has a compressive strength of not less than two-thousand pounds per square inch (PSI). The compressive strength of the concrete may be over a range such as between two-thousand to three-thousand five hundred PSI.

Generally, the concrete 800 is formed of a mixture including water, portland cement, and an aggregate. In one implementation, the concrete 800 is a ready mix of 2500 PSI compressive strength, ordered and supplied by truck, with an approximate mixture including 520 pounds (lbs) of portland cement, 1263 lbs of ¾ rock, 466 lbs of ⅜ rock (crush), 1389 lbs of sand, and 38 gallons of water to form one cubic yard of concrete. The concrete 800 of course may be also be formed by using a mixture of bag equivalents and scaled down to form less than a cubic yard for one square beveled or slanted sidewalk concrete tile with the desired compressive strength. Alternatively, water may be added to pre-mixed bags of concrete (e.g., 90 lb bags) of the desired compressive strength to manually form a volume of the concrete 800.

The concrete 800 is poured or placed into the interior opening to fill the unitary frame as shown in FIG. 8. Caps 712 may be placed on the opening of the pickup points 506 to prevent concrete from entering into the interior of the pickup point. Care should be taken while pouring the concrete so that independent pickup points 506 are not displaced or knocked over. Less care in pouring the concrete may be taken with the pickup points 206A-206B illustrated in FIGS. 2A-4A and 2B-4B as they may be coupled to the latticework and/or the frame. After the unitary frame is filled with the concrete mixture, the top of the pickup points may be covered by a thin layer of concrete. For example, the top of the pickup points may be covered by a layer of concrete that is approximately one-eighth (⅛) of an inch thick. The thin layer of concrete hides the pickup points from view underneath the top surface of the beveled or slanted concrete sidewalk tile.

Figure 9:
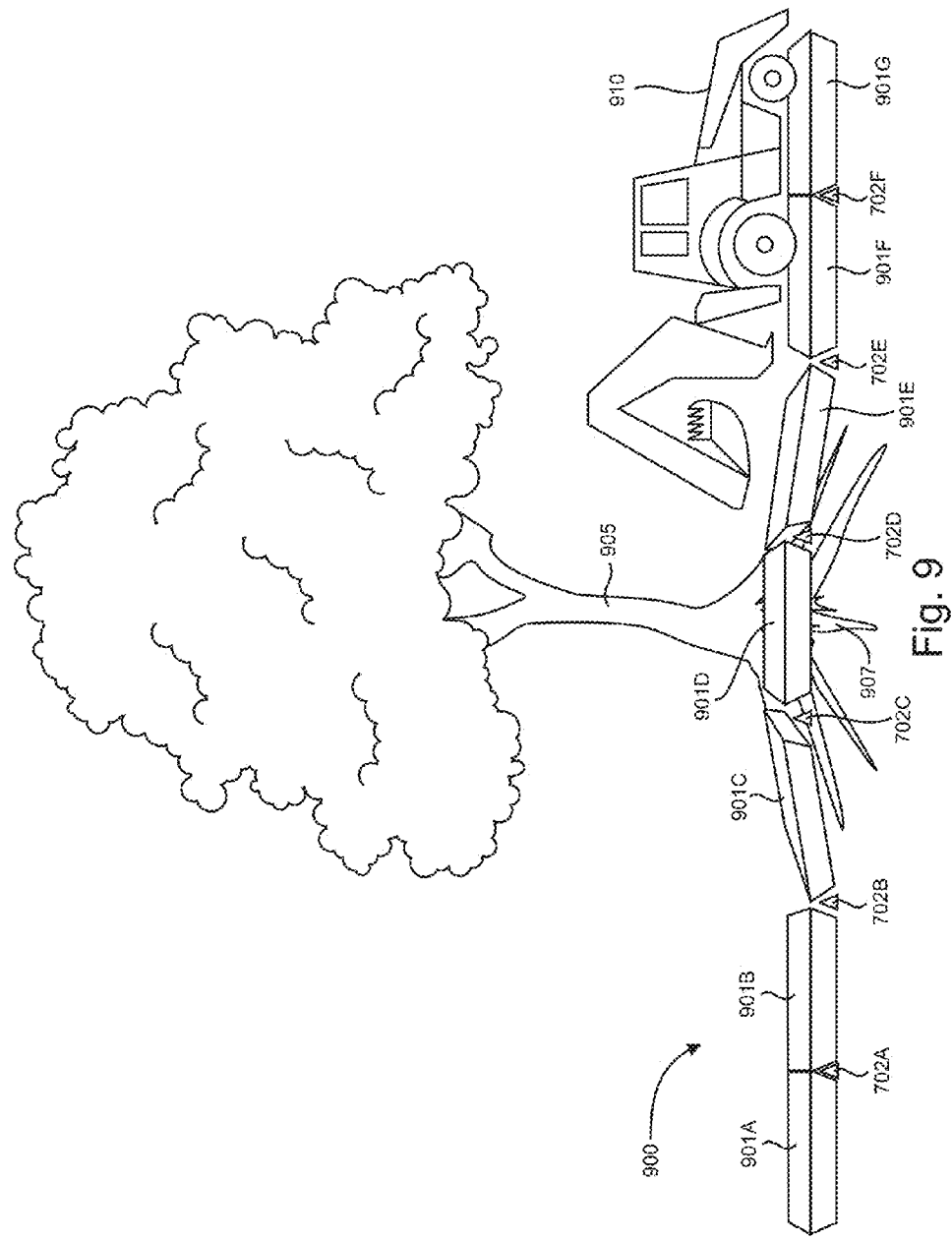
FIG. 9 is a side view illustrating a plurality of beveled removable concrete sidewalk tiles forming a concrete sidewalk that is displaced by tree roots.

Referring now to FIG. 9, a beveled or slanted concrete sidewalk 900 including a plurality of beveled or slanted sidewalk tiles 901A-901G with filler material 702A-702F between each. Near tiles 901C-901E is a tree 905. Although it may provide shade and be picturesque, the tree 905 may have an extensive root system 907 that over time may displace one or more beveled or slanted sidewalk tiles such as tiles 901C-901E. The beveled or slanted sidewalls of the beveled or slanted sidewalk tiles allow them to avoid cracking as they do not bind against neighboring sidewalk tiles when displaced by tree roots or lifted up by other means. Thus they will likely be displaced upward from the root pressure before cracking. However, even a displaced beveled or slanted sidewalk tile such as tiles 901C-901E may present a hazard to an unwary pedestrian. Thus, repairs of the grading underlying the beveled or slanted sidewalk tiles are made to avoid the hazard. With beveled or slanted sidewalk tiles, complete demolition of the displaced beveled or slanted sidewalk tiles 901C-901E can be avoided. The displaced beveled or slanted sidewalk tiles 901C-901E may be temporarily moved by equipment such as by the back-hoe 910 to gain access to the grading and the tree roots 907 to smooth out the surface upon which the tiles 901C-901E were resting.

When the sidewalk tiles are displaced by tree roots or work must be performed underneath a section of sidewalk, the pickup points are located and an anchor insert, eye bolt, or other attachment is screwed into the pickup point. A chain, a cable, or a strap may be attached directly to the eye bolt or a lifting member may be attached to an anchor insert to facilitate lifting.

With cables or chains coupled to the anchor insert, a crane or backhoe may be used to lift and move the entire sidewalk tile aside. The tree roots in the exposed section of grading may be cut and removed and the surface re-graded. The sidewalk tile may then be moved back into place without unnecessary demolition, replacement, or cure time.

Figure 10C:
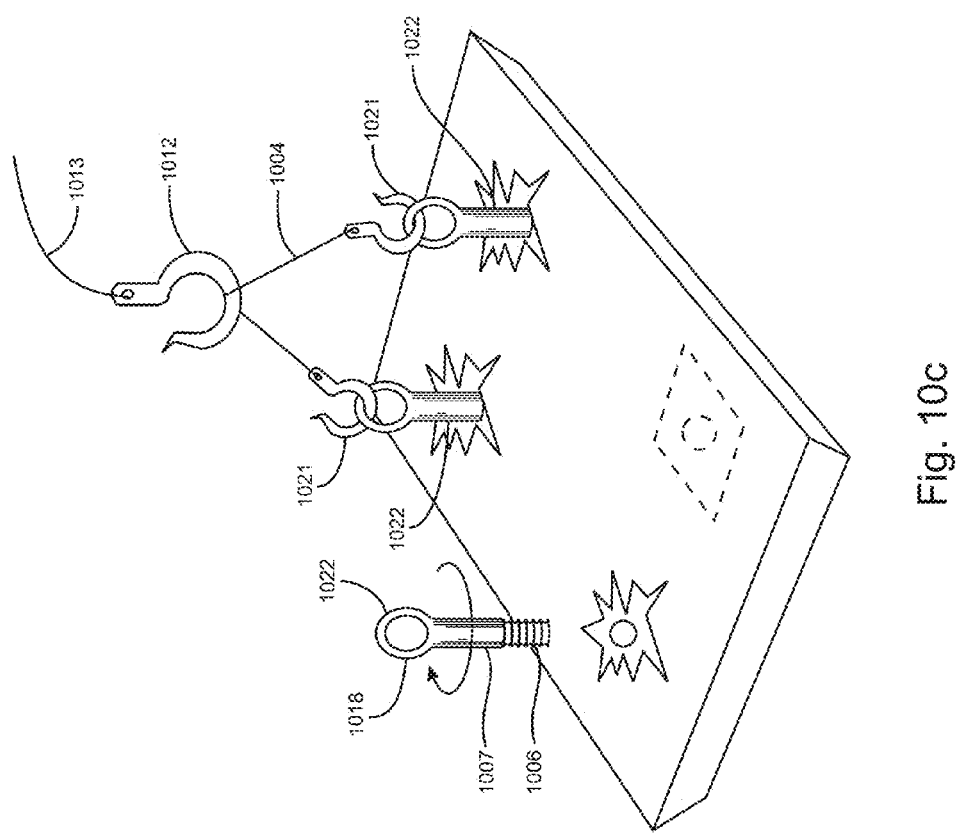

Referring now to FIGS. 10A-10C, attaching a sidewalk tile lifting apparatus its method of use is now described. The pickup points 506 are first located in the beveled or slanted sidewalk tile 1001. Several methods of locating the pickup points 506 may be employed. Among them, may be marking the concrete with the location of the pickup point. Another way may be to use a magnet to locate the pickup point if the said pickup point is made of a ferrous material. Placing the pickup points 506 at predetermined distances from top edges of the sidewalk tile may also be used to locate a buried pickup point.

A blunt force instrument 1050, such as a hammer, is used to break away a thin layer of concrete 1040 covering over the pickup points, such as illustrated by the uncovered pickup points 506' in FIGS. 10A-10C.

As illustrated in FIGS. 10A-10B, anchor inserts 1002 may be screwed into the uncovered pickup points 506'. The anchor insert 1002 includes a threaded shaft portion 1006, a shank portion 1007 and an expanded head portion 1008 having a larger diameter than the shank portion 1007. One end of a lifting member 1010 having an opening is then positioned over each head portion 1008 of the anchor inserts 1002. The opposite end of lifting member 1010 may be attached to rings 1011 and chain or cable 1004. A final hook 1012 with a cable or chain 1013 may be used to lift up on the chains or cables 1004.

As illustrated in FIG. 10C, instead of anchor inserts 1002, eyebolts 1022 may instead be screwed into the uncovered pickup points 506'. The eyebolts 1022 include a threaded shaft portion 1006, a shank portion 1007 and an eyelet head portion 1018. Prior to lifting the beveled or slanted concrete tile, the hooks 1021 of the chain or cable 1004 may be directly inserted into the eyelet head portion. A final hook 1012 with a cable or chain 1013 may be used to lift up on the chains or cables 1004.

Referring now to FIGS. 11A-11C, pick and re-placement of a beveled or slanted sidewalk tile is illustrated to gain access to the surface underneath. In FIGS. 11A-11C, a spreader bar 1110 is illustrated between points on the cables 1004. The spreader bar 1110 may be permanent or adjustable and constructed in accordance to an estimate of the heaviest load with the addition of a safety factor. The spreader bar 1110 is used to distribute the lifting stresses evenly over the beveled or slanted sidewalk tile, reduce the lateral force applied to the anchor inserts, and reduce the tendency of a sidewalk tile to bow.

In FIG. 11A, the cables 1004 with spreader bar are coupled to the anchor inserts 1002 which are coupled to the pickup points 506. A hook 1012 of another cable or chain 1013 may be coupled to the cables 1004 and the tile 1001 may be lifted away as illustrated in FIG. 11B.

As illustrated in FIG. 11B, the roots 907' may be cut away or removed and the surface under the tile 1001 may be graded.

As illustrated in FIG. 11C, the beveled or slanted sidewalk tile 1001 may be moved back on top of the flat graded surface 1150 in order with respect to the neighboring tiles.

The filler material 702 may be replaced along sides or sidewalls of adjacent neighboring tile prior to moving the sidewalk tile back.

Reference is now made to FIG. 12. After repositioning the beveled or slanted sidewalk tile 1001, the cables 1013, 1004, the lift members 1010, and the anchor inserts 1002 may be uncoupled and removed. Plugs or caps 712 may be replaced into the threaded opening of the pickup points 506 as shown and described herein. The thin surface of concrete 1040 previously broken out from the tile over the pickup points 506, may be patched with a new thin layer of cement or concrete 1206 as depicted in FIG. 12.

Figure 13:
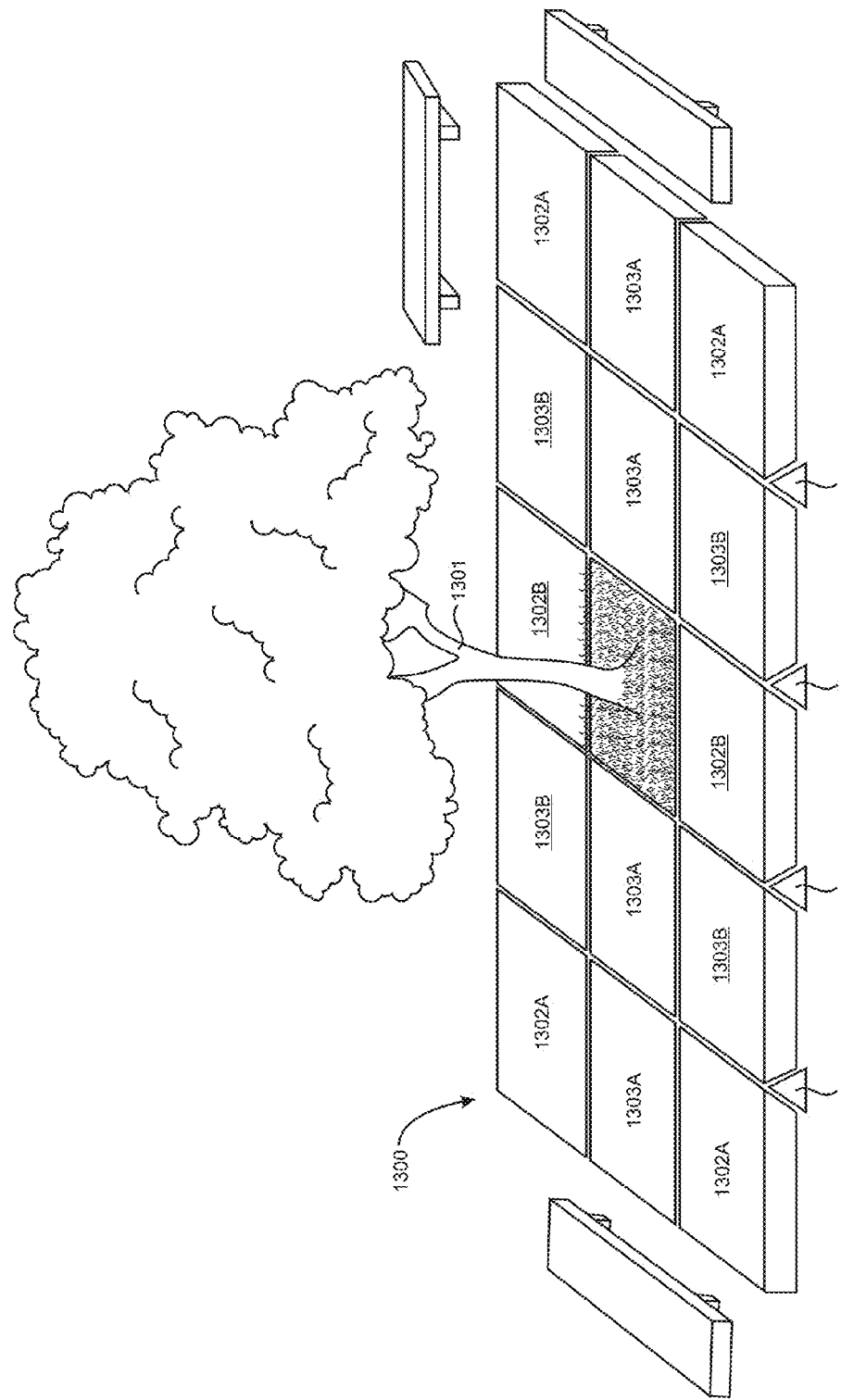
FIG. 13 is a top perspective view of a mosaic of beveled removable concrete sidewalk tiles adjacent to each other to form a patio or courtyard surrounding a tree.

FIG. 13 illustrates a plurality of beveled or slanted sidewalk tiles forming a patio or courtyard 1300 around a tree 1301. While all sides or sidewalls of a beveled or slanted sidewalk tile may be beveled or slanted for simplicity, the number of sides or sidewalls that are beveled or slanted may be one or fewer beveled sides or slanted sidewalls. For example, the patio or courtyard 1300 includes a plurality of two beveled or slanted sided sidewalk tiles 1302A, 1302B and a plurality of three beveled or slanted sided sidewalk tiles 1303A, 1303B placed adjacent to each other surrounding the tree 1301. The sides or sidewalls of the beveled or slanted sidewalk tile not interfacing to a sidewalk tile may be a regular straight side.

Each of the two beveled or slanted sided sidewalk tiles 1302A at the corners of the patio 1300 have two adjacent beveled or slanted sidewalls next to the neighboring beveled or slanted sidewalk tiles. Each of the two beveled or slanted sided sidewalk tiles 1302B have two opposite beveled or slanted sides or sidewalls next to the neighboring beveled or slanted sidewalk tiles. The beveled or slanted sides or sidewalls of the beveled or slanted unitary frames to form the two beveled or slanted sided sidewalk tiles 1302A-1302B would be the same adjacent or opposite sides or sidewalls.

Each of the three beveled or slanted sided sidewalk tiles 1303A-1303B of the patio 1300 have three adjacent beveled or slanted sides or sidewalls next to the neighboring beveled or slanted sidewalk tiles. If rectangular, the three beveled or slanted sided sidewalk tiles 1303A differ from the three beveled or slanted sided sidewalk tiles 1303B. The beveled or slanted sides or sidewalls of the beveled or slanted unitary frames to form the three beveled or slanted sidewalk tiles 1303A-1303B would be the same sides or sidewalls.

As the tree roots of the tree 1301 grow, one or more of the beveled or slanted sidewalk tiles may be displaced. Maintenance of the grading under the surface of the beveled or slanted sidewalk tile may be performed as previously described by temporarily removing the sidewalk tile and then replacing to bring the sidewalk tiles into level and aligned positions. With the beveled or slanted sidewalk tiles being removable, temporary repairs of sidewalk tiles, such by cement grinding or asphalt patching, are no longer necessary. With a removable slanted or beveled sidewalk tile, the grading there-under can be readily maintained in a more tree-friendly manner by curing problem roots earlier when they are smaller, Instead of the tree 1301, a beveled or slanted sidewalk tile may be placed in the center of the patio 1300. The center beveled or slanted sidewalk tile would have slanted or beveled sidewalls on all four sides to allow it interface with four adjacent beveled or slanted sidewalk tiles.

While certain exemplary embodiments have been described and shown in the accompanying drawings, it is to be understood that such embodiments are merely illustrative of and not restrictive on the broad invention, and that the embodiments of the invention are not to be limited to the specific constructions and arrangements shown and described. Rather, the embodiments of the invention should be construed according to the claims that follow below.

What is claimed is:

1. A method of removing and replacing sidewalk tiles comprising:
   determining the position of a plurality of pickup points within a sidewalk tile formed within a frame, wherein the frame and the sidewalk tile have one or more outwardly beveled sides to avoid interference with one or more adjacent sidewalk tiles;
   removing a surface concrete layer over each of the plurality of pickup points;
   coupling cables to each of the plurality of pickup points;
   pulling up on the cables to lift the sidewalk tile up and away from the one or more adjacent sidewalk tiles to expose a grading for repair;
   making the repair to the exposed grading; and
   replacing the sidewalk tile so that the one or more of the outwardly beveled sides of the sidewalk tile form a triangular gap with an outwardly beveled side of an adjacent sidewalk tile.

2. The method of claim 1, wherein
   prior to coupling cables, fastening a fastener to each of the pickup points, and coupling the cables to the fasteners to couple the cables to the plurality of pickup points.

3. The method of claim 1, further comprising
   removing the cables from the plurality of pickup points; and
   patching concrete onto the sidewalk tile over the plurality of pickup points.

4. The method of claim 1, wherein
   the exposed grading is repaired by removing tree roots.

5. A sidewalk construction kit to form one or more removable and replaceable sidewalk tiles, the sidewalk construction kit comprising:
   a first unitary frame having four sidewalls forming an interior opening with a base lip coupled to the four sidewalls, wherein at least two of the four sidewalls are slanted outward to avoid interference with an adjacent unitary frame, the interior opening of the first unitary frame to receive concrete;
   a first reinforcement structure positioned within the interior opening and coupled to two or more sidewalls of the first unitary frame, the first reinforcement structure to couple to concrete poured into the interior of the first unitary frame to strengthen the removable and replaceable sidewalk tile;
   a second unitary frame, the second unitary frame having four sidewalls forming an interior opening with a base lip coupled to the four sidewalls, wherein at least two of the four sidewalls are slanted outward to avoid interference with an adjacent unitary frame, the interior opening of the frame to receive concrete;
   a second reinforcement structure positioned within the interior opening and coupled to two or more sidewalls of the second unitary frame, the second reinforcement structure to couple to concrete poured into the interior of the second unitary frame to strengthen the removable and replaceable sidewalk tile; and
   a plurality of reinforced pickup points to be positioned within the interior opening of the first and second unitary frames, the height of each of the reinforced pickup points being less than the height of the sidewalls of the first and second unitary frames such that the reinforced pickup points are to be buried just under the surface of the concrete;

wherein first and second unitary frames are placed adjacent to each other such that their slanted sidewalls form sides of a triangular space between the adjacent first and second unitary frames.

6. The sidewalk construction kit of claim 5, wherein
the reinforced pickup points are independent pickup points coupled to bases to provide additional support for load bearing.

7. The sidewalk construction kit of claim 5, further comprising:
a plurality of plugs or caps to respectively couple into a threaded opening in the plurality of reinforced pickup points to avoid concreted filing into the plurality of pickup points.

8. The sidewalk construction kit of claim 5, further comprising:
a strip of triangular shaped filler material to fill between adjacent unitary frames, the filler material to allow expansion and contraction of adjacent sidewalk tiles.

9. The sidewalk construction kit of claim 8, wherein
the filler material is a felt material or a hardened foam material.

10. A method of forming a sidewalk with removeable and replaceable concrete sidewalk tiles, the method comprising:
placing a first unitary rectangular frame with one or more outwardly slanted sidewalls on a surface;
placing a second unitary rectangular frame with one or more outwardly slanted sidewalls adjacent to the first unitary frame such that the outwardly slanted sidewalls of the first and second unitary frames form the sides of a triangular gap between each adjacent unitary frame;
positioning a plurality of reinforced pickup points within the interior of the first and second unitary rectangular frames;
pouring concrete into the interior of the first and second unitary rectangular frames to cover over the plurality of reinforced pickup points, a head of the plurality of reinforced pickup points covered by a thin layer of concrete;
smoothing over a surface of the concrete to form a flat surface; and
allowing the concrete to set and bond to the first and second unitary rectangular frame.

11. The method of claim 10, wherein
prior to pouring concrete,
reinforcing the first unitary rectangular frames with a first latticework,
reinforcing the second unitary rectangular frames with a second latticework,
coupling the first and second latticework to the plurality of reinforced pickup points, and
coupling a cap into a threaded opening in each of the plurality of reinforced pickup points.

12. The method of claim 10, wherein
each of the first and second unitary rectangular frames includes
a lip coupled to the base of each sidewall to support the concrete over the graded surface and avoid each sidewall from digging into the graded surface, and
a reinforcement mesh coupled to each sidewall to strengthen the removeable and replaceable concrete sidewalk tile.

* * * * *